United States Patent [19]

Friedrich

[11] 4,213,747
[45] Jul. 22, 1980

[54] METHOD OF AND APPARATUS FOR CONTROLLING THE VISCOSITY OF MOLTEN PLASTICS MATERIAL WHICH IS TO BE MOULDED

[75] Inventor: Reinhard Friedrich, Dachtel, Fed. Rep. of Germany

[73] Assignee: Werner & Pfleiderer, Stuttgart, Fed. Rep. of Germany

[21] Appl. No.: 961,198

[22] Filed: Nov. 16, 1978

[30] Foreign Application Priority Data

Nov. 16, 1977 [DE] Fed. Rep. of Germany ....... 2751225

[51] Int. Cl.$^2$ ............................................. B29F 3/06
[52] U.S. Cl. ...................................... 425/144; 73/55; 264/40.1; 264/176 R; 425/146
[58] Field of Search .......................... 264/40.1, 176 R; 425/144, 146; 73/55

[56] References Cited

U.S. PATENT DOCUMENTS

| | | | |
|---|---|---|---|
| 2,763,308 | 9/1956 | Samler . | |
| 2,814,472 | 11/1957 | Erdmenger . | |
| 3,209,581 | 10/1965 | Crane et al. | 73/55 |
| 3,248,469 | 4/1966 | Kosinsky et al. | 425/146 |
| 3,314,107 | 4/1967 | Honstrater | 425/146 |
| 3,357,049 | 12/1967 | Spindler | 425/146 |
| 3,360,986 | 1/1968 | Rothschild | 264/40.1 |
| 3,718,414 | 2/1973 | Jones, Jr. | 425/146 |

FOREIGN PATENT DOCUMENTS

2121305 9/1972 Fed. Rep. of Germany .
2054615 2/1973 Fed. Rep. of Germany .

OTHER PUBLICATIONS

"1970 Annual Book of ASTM Standards," *American Society for Testing Materials,* Part 27, pp. 410–420.
"Bestimmung des Schmelzindex von Thermoplasten," *DIN 53735,* pp. 1–3.
McGinnis, F. H., "Continuous Capillary Rheometers for On–Line Control," *Seismograph Service Corporation,* pp. 1–13.
Bernhardt, E., "Processing of Thermoplastic Materials," pp. 209 and 257.
Product Description Publication–Coreli, "Palcor."

*Primary Examiner*—Jeffery R. Thurlow
*Attorney, Agent, or Firm*—Browdy and Neimark

[57] ABSTRACT

A plastics extruder in operative association with a control arrangement is disclosed. The plastics extruder includes a screw extruder, a screen downstream of the screw extruder, a throttle located between the screw extruder and the screen, a moulding tool downstream of the screen, and a melt index measuring device. The measuring device includes a metering pump whose rotational speed is controllable and which is provided with a rotational speed indicator, a measuring nozzle disposed in a sample flow channel, and pressure and temperature sensors connected to the sample flow channel directly upstream of the inlet of the measuring nozzle. The sample flow channel is adapted to be located downstream of the screen pack and upstream of the moulding tool. For the purpose of regulating the viscosity of the plastics material melted in the screw extruder, the throttle cross-section is variable by a servomotor connected to the output of a programmable two-coordinate controller. The characteristic of the controller provides a desired value output and can be predetermined as a temperature-pressure characteristic when the metering pump is operated with constant delivery, or as a temperature-delivery characteristic when the metering pump is operated with a constant pressure drop via the measuring nozzle while the temperature sensor is connected to one of two actual value inputs of the two coordinate controller. Either the pressure sensor or the rotational speed indicator is connected to the second actual value input.

9 Claims, 6 Drawing Figures

METHOD OF AND APPARATUS FOR CONTROLLING THE VISCOSITY OF MOLTEN PLASTICS MATERIAL WHICH IS TO BE MOULDED

BACKGROUND OF THE INVENTION

The invention relates to a control arrangement for a plastics extruder including a melt index measuring device consisting of a metering pump whose rotational speed is controllable and which is provided with a rotational speed sensor, a measuring nozzle disposed in a sample flow channel; and pressure and temperature sensors connected to the sample flow channel directly upstream of the inlet of the measuring nozzle and downstream of a screen of the plastics extruder. The invention relates also to a method of regulating the viscosity of molten plastics moulding material by acting on a material flow throttle point following kneading treatment of the plastics material.

Apparatus of the kind mentioned above is known from the house publication F. H. McGinnis, *Continuous Capillary Rheometers for On-Line Process Control*, SEISCOR Division, Seismograph Service Corporation, Tulsa, Okla. Apparatus of this type was developed with a view to determining, during plastics processing, melt indices such as are conventionally obtained after sampling by standardized laboratory treatment. For this purpose, in the arrangements described in the above-noted publication a sample flow is diverted from the current production process by way of a sample flow channel and, in an adapter channel, is cooled or heated by means of heat exchangers, with an adequate residence time, to the temperature corresponding to the standard temperature for comparison measurements on a laboratory scale, because the comparison data for materials which are customarily used in the plastics industry is adjusted to these standard conditions for laboratory measuring arrangements; see the parameters for melt index measurement which are fixed in ASTM (American Society for Testing Materials Standard) D 1238-65 T or DIN (German Standard Specification) Specification 53735.

From the Federal Republic of Germany Auslegeschrift (Published Patent Application) No. 20 54 615 a control circuit is known which is to achieve coupled regulation of the temperature and pressure of molten plastics material upstream of a moulding tool following a plastics screw press. The controlled port of the system is the channel upstream of the moulding station, while the correcting element used is an annular gap throttle disposed downstream of the screw press and formed between a cylindrical extension of the press screw itself, located inside a hollow cylinder. For the purpose of varying the throttle action, the entire press screw, and consequently also its cylindrical end, is displaced axially in order to vary the effective axial length and hence the flow-resistance of the annular gap. In addition, action on the controlled part of the system is also taken by varying the working rotational speed of the press screw. For the determination of actual values use is made of pressure and temperature sensors upstream of the moulding tool. The comparison of desired and actual values is made by means of a process control computer which is programmed with a response function gradient of the particular screw press, this gradient being recorded at the desired operation point, under operating conditions. This programming is not described herein in detail. It is simply stated that in order to achieve good mouldability of the plastics material the simultaneous regulation of temperature and pressure upstream of the mould tool is desirable and that for this purpose disturbing influences in respect of these variables should be corrected in a very short time. It is, of course, hereby not forgotten that, contrary to the basic assumptions in German Auslegeschrift No. 20 54 615, the pressure upstream of the moulding tool is by no means dependent solely on the rotational speed of the screw, even with a constant throttle gap length. On the contrary, the temperature of the material depends on the gap length, the rotational speed of the screw, and other influencing variables (such as quantity flow, substance values, and effective pressure totals in the plant upstream of the moulding tool), so that the desired controller function cannot be achieved for practical reasons. Apart from quantity flow, substance values, and temperature of the stock, the actual pressure upstream of the moulding tool is in fact dependent primarily on the geometry of the moulding tool. These conditions are described in E. Bernhardt, *Process of Thermoplastic Materials*, 1959, particularly equation 152 on page 257 and FIG. 4.31 on page 209.

In contrast to the known systems the invention is based on the realisation that on the one hand, in the processing of plastics materials in single-shaft or multi-shaft screw kneaders the thermal history and consequently the melt viscosity of the molten plastics material which is to be moulded, are very important for the quality of the end product, and that, on the other hand, the known arrangements for on-line sampling (which involves the judging of the probable quality of the moulded end product on the basis of material properties existing upstream of the moulding tool) cannot be used directly because the action of these measuring devices is based on a temperature reaction in the sample taken off and consequently on a comparatively long period of time for making the measurement. Upstream of the moulding tool, however, comparatively rapid fluctuations of the properties of the material, (which can be defined by the instantaneous melt index), may occur, for which reason previously known arrangements appear to be satisfactory only where because of the specific material processing steps such rapid fluctuations are not or are not yet of importance or occur only sufficiently slowly. On the other hand, for certain fields of application values of melt viscosity which lie within fixed limits must be complied with by the molten plastics material which is to be moulded. Thus, particularly in the case of polyolefines the observance of these limits is very decisively dependent on the temperature of the plastics material after it leaves the screw kneader. This temperature is, however determined not only in accordance with the material volume throughput, rotational speed of the screw, the geometry of the screw, and the maintenance of the temperature of the screw casing, but is also very decisively dependent on the pressure of the molten material upstream of the screw tip. In this region the energy dissipated by the screw is directly proportional to pressure, and almost the entire amount of the dissipated energy in converted into heat, thus leading to a corresponding rise of temperature in the pressed plastics material. This increase in temperature caused by the pressure upstream of the screw tip may be desirable, for example in the thermal degradation of polypropylene (namely in the case of a heavy reduction of viscosity).

On the other hand, the effect in the normal granulation of polypropylene or of low-pressure polyethylene is undesirable. Before the granulation of such materials, particularly if the granulate is to be of film quality, the molten plastics material is filtered through fine-mesh screens, which gradually clog and are regularly replaced by means of a screen changing device. For the judgement of the quality of the plastics material to be moulded it must therefore be borne in mind that the pressure which has to be applied for passage through the screens must be added to the back-pressure caused by the moulding tool; and this additional pressure is not a constant magnitude but increases with the degree of soiling of the screen, while immediately after a screen is changed the additional pressure drops abruptly to a low initial value. Experiments have shown that pressure increases of between 20 and 40 bars may occur as the result of the clogging of the screens.

The pressure increases which occur because of the clogging of the screens can be compensated by disposing between the outlet end of the screw kneader and the screen changing device a throttle which has a variable passage cross-section for the molten material and whose throttle action is as far as possible reduced in proportion as a pressure rise through the screen pack occurs, in order to ensure that upstream of the moulding tool, the extrusion temperature is kept as constant as possible. However, the control of the throttle cannot be limited to dependence on the instantaneous pressure of the molten material; as previously mentioned the melt index of the plastics material which is to be moulded is in fact of decisive importance for the quality of the material, and the relationship between the viscosity of the molten material and the pressure in the molten material is dependent not only on the material itself, but also upon processing influences resulting from the screw kneader actually used.

SUMMARY OF THE INVENTION

Consequently, the problem underlying the invention is that of developing apparatus of the kind first described above so that in the interest of constant properties of the material entering the mould the adjustment of the throttle in accordance with the instantaneous melt index upstream of the moulding tool, taking into account the melt index characteristic of the desired properties of the material, is made possible.

According to the invention there is provided a control arrangement for a plastics extruder, including a screw extruder, a screen downstream of the screw extruder, a throttle located between the screw extruder and the screen, a moulding tool downstream of the screen, and a melt index measuring device which comprises a metering pump whose rotational speed is controllable and which is provided with a rotational speed indicator, a measuring nozzle disposed in a sample flow channel, and of pressure and temperature sensors connected to the sample flow channel directly upstream of the inlet of the measuring nozzle, the sample flow channel being adapted to be located downstream of the screen pack and upstream of the moulding tool, wherein for the purpose of regulating the viscosity of a plastics material melted in the screw extruder, the throttle cross-section is variable by means of a servomotor connected to the output of a programmable two coordinate controller whose characteristic provides a desired value output and can be predetermined as a temperature-pressure characteristic when the metering pump is operated with constant delivery, or as a temperature delivery characteristic when the metering pump is operated with a constant pressure drop via the measuring nozzle while the temperature sensor is connected to one of two actual value inputs of the two coordinate controller and either the pressure sensor or the rotational speed indicator is connected to the second actual value input.

While using a measuring device which has proved successful as such, the arrangement according to the invention ensures genuine regulation of the viscosity, immediately upstream of the moulding tool, of the plastics material which is to be processed, while the base for the operation of the controller is the knowledge that it is not necessary to effect the determination of the melt index at temperature which correspond to the standardized measuring conditions or comparison tables for laboratory investigation; on the contrary, it is sufficient to determine the temperature dependence of the viscosity for a determined type of plastics material from material data known as such and then, irrespective of fluctuations from the standard temperature, to ascertain the melt index at instantaneous temperatures upstream of the moulding tool by measuring the pressure difference with the aid of a capillary measuring nozzle for a measured or constant sample flow, whereupon deviations from the desired viscosity of the material can be compensated within a short time by correspondingly varying the passage cross section of the throttle.

In order to avoid as far as possible hunting due to transit time effects, it is expedient—as a strict deviation from the previously known method of utilising melt index measuring devices—not only to dispense with a temperature adapter for the sample flow channel but, in accordance with a further feature of the invention, to work with a short sample flow channel and to dispose the melt index measuring device in intimate thermal contact on a casing of the extruder between the screen and the moulding tool.

It is thereby ensured that melt index variations will be detected practically without inertia or time-lag, because apart from pressure fluctuations the temperature variations in the material upstream of the moulding tool act on the measuring sensors practically without delay and without damping, so that its changed temperature value can thus be allocated in the controller characteristic line to the changed pressure (or changed throughput value) for the signal concerning the control deviation.

The throttle itself, that is to say the correcting element of the control circuit, is expediently in the form of a separately installed axial annular gap throttle connected to the output of the actual screw kneader, and consists of a hollow cylinder and of a pin piston axially displaceable therein by means of a servomotor. A throttle of this kind is in fact substantially more sensitive and can be adjusted with less expense for apparatus than in the case of the axial displacement of an entire loaded screw in accordance with the prior art.

The melt index control circuit described can per se work continuously without difficulty. It is, however, more advantageous from the point of view of apparatus to construct it as a discontinuous or sampling control circuit. If the sampling intervals are adapted to the data of the material and to the fluctuations of the properties of the material that occur, disadvantages in the form of increased hunting are practically eliminated.

On the other hand, the advantage is thereby gained that at the output of the controller only a particularly simple signal regarding the control deviation is required as control signal for the throttle since a variation of the throttle adjustment is made step by step by a predetermined interval until the melt index data in the controlled system lie within the range of predetermined tolerances at the desired working point on the characteristic line of the controller.

In the two-coordinate controller used in accordance with the present invention the set point or desired value/actual value comparator employed may be an x-y sampler, which is operated by the two actual values and works like a scanning on-off-controller (bang-bang-servo) to follow the edge of a templet cut in accordance with the set point function (controller characteristic). Controllers of this kind work, for example, after the style of conventional chopper bar controllers, with the particular feature that the abscissa variable is now not time but the instantaneous temperature, detected at the first actual value input, in the molten material upstream of the moulding tool. Two-coordinate controllers of this kind are obtainable commercially, for example as a "STANYCORPALCOR" program controller. Their function is based on mounting on a conductive base surface a non-conductive film whose edge path corresponds in the coordinate system to the function of the controller characteristic. As long as the scanning pin deflected in two mutually perpendicular directions, i.e. x and y directions in accordance with the two actual values lies on the insulating film under the desired controller characteristic serving as desired value, there appears at the output of the controller an output signal which acts on the throttle in such a manner that the sensing pin runs in the direction of the edge of the film, that is to say towards the path of the controller characteristic, as the result of parameter variations in the controlled system. If the sensing pin passes beyond this edge of the film it runs onto the electrically conductive base surface, and a signal acting on the correcting element in the opposite direction then appears at the output of the controller. In this way it is ensured that the sensing pin fluctuates around the path of the controller characteristic, so that conditions corresponding approximately to actual value parameter pairs in accordance with the desired value function are adjusted in the controlled system. The amount of these fluctuations around the desired value can be predetermined by the sensing period, that is to say by the periodicity of the interrogation of the pressure and temperature sensors in the control system, for which purpose two-coordinate controllers of this kind are usually already equipped with a corresponding adjustable interval timer.

Instead of the above mentioned program controller with predetermined desired value utilising a cut templet, similarly working programmed controllers with optical or other electronic scanning of the two-dimensionally predetermined controller or desired value characteristic may also be used.

A two-coordinate controller in the form of a digital comparison computer, although more expensive in respect of apparatus, is substantially more versatile in respect of possible practical applications. For this purpose it is for example possible to use the programmable Hewlett-Packard desk computer Model 9815A with magnetic tape cassette store, or also—although less convenient in respect of data input facilities for new characteristic line parameters—a more economical microprocesser with programmable store. In this case the empirically determined diagram of the controller characteristic (see below) is expressed as a mathematical polynomial and stored in the comparison computer, which thereupon compares pairs of actual values with the associated function value of the stored controller characteristic and in the same way as previously described provides at the output of the controller a signal regarding the control deviation, in accordance with which the previously adjusted throttle cross-section is enlarged or reduced in size in order to enable the pairs of actual values to be adjusted once again in the controlled system in accordance with the existing viscosity of the material. For the programming of such mathematical comparison operations in the comparison computer it is possible to use the standard programmes made available by the suppliers of the computers unless in the concrete individual case an optimised programme is to be referentially and individually prepared with due regard to the production circumstances actually existing.

In order on the one hand to avoid as far as possible hunting even after considerable deviations from the desired state in the controlled system, and on the other hand also to achieve rapid return to steady-state conditions after deviations from the desired state, in accordance with another development of the invention it is expedient for the controller output signal and/or the comparison interval to be varied in dependence on the instantaneous desired value deviation occurring, in such a manner that desired value/actual value comparisons are preferably made in rapid succession with the control circuit operating in the steady state and that any deviations will result only in small unit adjustments of the throttle; while when the instantaneous melt index in the system is far beyond the controller characteristic larger unit adjustments are made to the throttle at longer intervals of time, until once again adequate approximation to the specified characteristic line has been achieved.

It will be conceivable for both the pressure and the temperature of the extrusion stock upstream of the moulding tool to be acted on by means of separate correction elements in the event of deviations from the desired value. Such double correcting action in the controlled system, corresponding to the determination of the two actual values, could however soon lead to uncontrollable behaviour of the regulating circuit, because of the dependence of pressure and temperature in the plastics composition to be extruded, unless special expensive additional steps were taken. Moreover, because of the thermal behaviour of the installation and of the stock, action on the temperature of the controlled system as a correcting variable would be possible only slowly and it would be necessary to take this into account additionally as dead time in the dimensioning of the time behaviour of the control circuit. On the other hand, when the throttle is adjusted a rapid variation of the pressure in the stock upstream of the moulding tool is possible, with a corresponding, although delayed fluctuation of the temperature in accordance with the existing data of the material. It is, therefore expedient within the framework of the present invention, as already indicated, to base the mode of operation of the control circuit on correcting the control deviation, once it has been determined, primarily by using as correcting variable the pressure in the control system with the temperature—at first—constant, which can also be achieved in a simple manner, where apparatus is concerned, by means of the annular gap throttle already described.

For the practical utilisation of the invention it is expedient to provide a certain switching hysteresis in the course of the desired value/actual value comparison, in order to avoid unnecessary switching play at the throttle and thus to avoid wear on components and any tendency of the control circuit to hunt.

On the other hand, in accordance with an additional development of the invention it is expedient for practical utilisation to ensure by means of limit value switching-over that the automatically acting control circuit is put out of operation if heavy deviations of the melt index from the desired value or controller characteristic line are detected, because then other material parameters may in certain circumstances by of decisive importance for the quality of the material, and because then material having undesirable properties would be moulded during the comparatively long time before a return to the desired conditions is achieved.

In connection with the process first mentioned above, according to the invention an empirically determined melt index or controller characteristic line $\Delta p \times f(T)$ or $\dot{Q} = f(T)$ is given as desired value characteristic for the specific plastics material, the melt index is determined at predetermined intervals at the instantaneous temperature of the molten plastics material before it is moulded, and depending on the deviation of the ordinate actual value from the controller characteristic line, with the instantaneous temperature is abscissa value, the throttling of the flow of material is increased or reduced.

Particularly when, as discussed above, in the two-coordinate controller, serving as desired value/actual value comparator, a programmable digital computer is expediently used as sampling controller working in accordance with two coordinates, according to a further development of the method of the invention it is expedient, for the purpose of obtaining melt index or controller characteristic lines specific to the material, for the screw kneader provided to be operated with known materials at different temperatures of the material upstream of the moulding tool, while melt index measurements are made at variable temperatures. These measurement results may be fed directly into a store in the controller computer and, as known as such in the use of programmable computers for the statistical evaluation of experimental results, converted into polynomials of the controller characteristic line which are to be stored.

Since, as already stated above, the control circuit according to the invention is preferably not switched to automatic operation until after the plant after start-up has been run to the intended operating point, it is expedient so to design the controller computer that, during this operating phase, the pairs of actual values determined via the melt index measuring device are expressed by the controller computer merely as orientation values for the manual operation, advantageously in conjunction with the giving of a signal when a predetermined operating point or desired value is reached.

BRIEF DESCRIPTION OF THE DRAWINGS

The invention is to be described by way of example with reference to the accompanying drawings which show apparatus according to the invention and its application for the carrying out of a control process according to the invention.

DETAILED DESCRIPTION OF THE PREFERRED EMBODIMENTS

Figure 1:
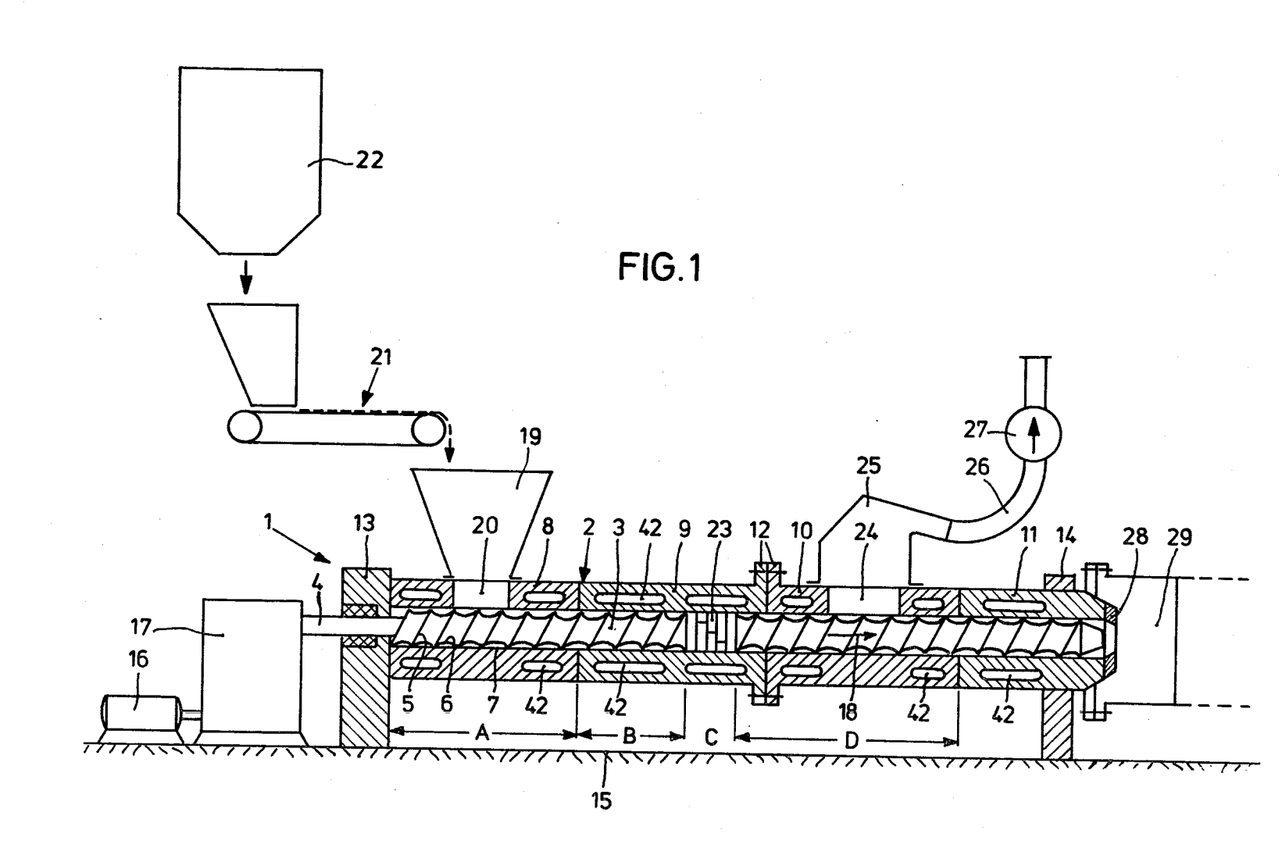
FIG. 1 shows a plastics extruder having a screw kneader, in vertical longitudinal section.

In the screw kneader 1 shown in simplified manner in vertical longitudinal section in FIG. 1 there is arranged in a casing 2 a rotatable screw 3. The latter consists of a screw shaft 4 on which are arranged screw flights 5 which run helically and between which there are screw channels 6. The screw 3 is arranged in a screw bore 7 of the casing 2 in such a manner that the screw flights 5 have only a slight clearance vis-a-vis the inner wall of the casing 2, that is to say against the wall of the screw bore 7, The casing 2 consists of individual sections designated as 8, 9, 10, 11 which in each instance are bolted together to one another, in axially aligned manner, by means of flanges 12 (of which only those between the sections 9 and 10 in FIG. 1 are shown). The whole casing 2 resulting from this is supported via supporting pillars 13, 14 arranged in the region of both its ends, on a pedestal 15. The screw 3 is rotated by a motor 16 via a step-down gear 17, so as to urge material feed into the bore in a conveyor direction indicated by arrow 18.

On the first casing section 8 there is arranged a material feed funnel 19 which is joined to the screw bore 7 via entrance opening 20. The material which is to be processed is fed in powdered form from a bunker 22 to the material feed funnel 19 via a metering device 21 which is usually a conveyor type weigher.

The first casing section 8 forms an intake zone A from which the material is fed to a pressure build-up and plasticising zone B in the immediately ensuing casing section 9. Downstream of zone B there is arranged—still in the casing section 9—a kneading zone C. In the latter there are arranged, on the screw shaft 4, baffles 23, by means of which the material which is to be treated is particularly intensively kneaded. Such baffles 23 are known from Federal Republic of Germany Pat. No. 940,109 (corresponding to U.S. Pat. No. 2,814,472 and British Patent Specification No. 755,069). If it is necessary, several such pressure build-up and plasticising zones B with in each instance kneading zones C disposed downstream thereof may also be arranged successively to provide the desired characteristics for the molten material. In the casing section 10 which is downstream of the kneading zone C there is arranged a decompression and degassing zone D in which there takes place a pressure reduction in the material and then a degassing. For this purpose, a hood 25 is joined in gastight manner to the casing section 10 via degassing bore 24 provided for this purpose in the latter; from the hood 25 a pipe-line 26 leads to a vacuum pump 27.

Figure 2:
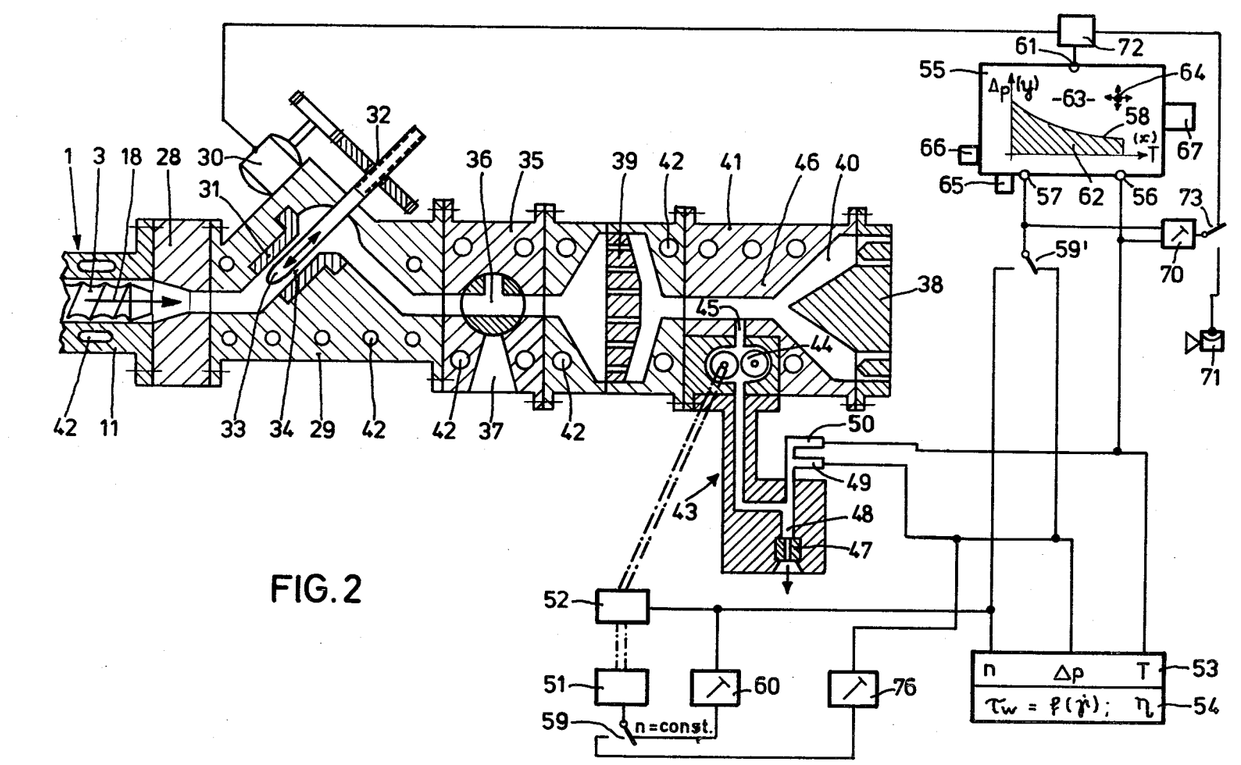
FIG. 2 shows in a simplified form a vertical longitudinal sectional view of a moulding tool which is arranged downstream of the screw kneader according to FIG. 1 and an axial throttle, a starting valve and a screen pack and which has a built-on melt index measuring device for a control circuit, shown as a block diagram, with the throttle as a correcting element according to the invention.

Downstream of the last casing section 11 with the outlet end 28 of the screw kneader 1, in which the screw 3, ends, there is arranged an axial throttle 29 which is adjustable; the effective passage cross-section of the throttle 29 can be varied via an electrically operable servomotor 30 (of FIG. 2). Such a throttle 29 is for example known from Federal Republic of Germany Offenlegungsschrift (Laid Open Patent Application) No. 21 21 305. The throttle 29 is an adjustable axial annular gap throttle 29 as can be seen from the vertical longitudinal section principle representation of FIG. 2. It consists essentially of a hollow cylinder 31 arranged in the flow path downstrea of the outlet end 28 of the screw kneader 1, and of a pin piston 33 which is axially displaceable in the hollow cylinder 31 by means of the servomotor 30 via a worm gear 32. The effect is determined by how far the pin piston 33 has travelled into the hollow cylinder 31, that is to say by the effective axial length of the annular gap 34 between the hollow cylinder 31 and the pin piston 33.

Downstream of the throttle 29 there is arranged in conveyor direction 18 a starting valve 35 as is usual in extruder plants. This works with the use of a three-way cock 36 in order, during the start-up phase of the plant, to be able to remove through an outlet 37 the first melt (i.e. the molten material) arriving here, until steady-state conditions have set in upstream of the moulding tool 38, which may be for example, an underwater perforated granulating plate as extrusion moulding tool.

Downstream of the starting valve 35, however, there is first arranged a filter device in the form of a screen pack 39 which, by means of a screen changing device, can, when clogged, be exchanged for a fresh screen pack 39. Such screen pack devices are known for example from U.S. Pat. No. 2,763,308.

The melt forced through the screen pack 39 passes into the distribution channels 40 of a connecting head 41 for the moulding tool 38.

Heating ducts 42 are provided both in the individual sections 8, 9, 10, 11 of the casing 2 of the screw kneader 1 and also in the casing regions or wall regions of the described units arranged downstream of the outlet end 28 of the screw kneader 1. According to the state of aggregation achieved and the intended mechanical influencing of the plastics material which is to be treated, the heating ducts 42 ensure that the individual sections of the whole plant are kept, by means of hot water or by means of cartridge heaters, to certain temperatures ascertained empirically for the desired mode of treatment of the material actually under consideration.

A melt index measuring device 43 is attached to the connecting head 41 upstream of the moulding tool 38. This device 43 has a metering pump 44 constructed as gear pump which is arranged in a sample flow channel 45 which branches off upstream of the distribution channels 40. In order to be able to construct the sample flow channel 45 as short as possible in the interest of avoiding heat losses in the branched-off melt sample flow, the metering pump 44 is placed in the casing 46 of the connecting head 41, as is shown symbolically in FIG. 2. The sample flow channel 45 ends at the entrance of a capillary measuring nozzle 47 whose exit side is open to the ambient atmosphere. The measuring nozzle 47 has, in regard to its radius R (not shown) and its length L, a very defined geometry preferably agreeing with the standard dimensions of corresponding laboratory measuring devices. Upstream of the entrance of the measuring nozzle 47 these are connected to the sample flow channel 45 a pressure sensor 49 and a temperature sensor 50. The metering pump 44 is coupled on one side to a drive motor 51 and, on the other side, to a rotational speed indicator 52, for example a motor-tachogenerator or a pulse generator. It is the distinctive feature of such gear-pump metering pumps 44 that they supply a quite exact delivery volume per revolution so that the rotational speed indicator 52 can give an accurate indication of the delivery volume per unit time, namely with constant rotational speed n of the drive motor 51 or of the metering pump 44. Also by appropriate operation of the drive motor 51 the delivery amount in the sample flow channel 45 can therefore be influenced in a controlled manner.

For melt index determination, that is to say for the determination of the material properties through measurement of the material viscosity and other parameters at the exit of the screen pack 39 and thus upstream of the moulding tool 38 there is supplied to the measuring nozzle 47 by means of the metering pump 44 a melt ribbon or product stream of defined volume per unit time, which ribbon or stream is drawn off from the connecting head 41 upstream of the moulding tool 38 in the course of the feeding of the moulding tool 38 from the screw kneader 1. During passage through the measuring nozzle 47 there occurs via the latter a pressure drop $\Delta P$ which is measured by means of the pressure sensor 49, with simultaneous temperature measurement at the entrance 48 of the measuring nozzle 47 by means of the temperature sensor 50, with constant delivery of the metering pump 44. In specific cases, which are gone into below, it is more expedient so to adjust, via measurement of the pressure drop $\Delta p$, the rotational speed n of the metering pump 44 that a constant pressure drop $\Delta p$ always sets in. For the shear viscosity $\eta$ of the melt in the measuring nozzle 47 the relationship $\eta = \tau \text{wall}/\dot{\gamma} [\text{kpsec/cm}^2]$ holds good, $\tau$ wall being the shearing strain of the melt at the wall of the measuring nozzle 47 and $\dot{\gamma}$ being the shear speed.

In view of the given geometry of the measuring nozzle 47 for the shearing strain at the nozzle wall the relationship $$\tau \text{ wall} = \frac{D}{4} \cdot \frac{\Delta p}{L} \ [kp/cm^2]$$

with D=2R holds good. Accordingly, for the shear speed the relationship $$\dot{\gamma} = \frac{32 \cdot \dot{Q}}{\pi \cdot D^3} \ [\text{sec}^{-1}]$$

holds good. In the last mentioned relationship, $\dot{Q}$ is the volume flow of the melt per unit time.

The units in the above relationships are centimetres for the diameter D or for the radius R and for the length L of the measuring nozzle 47. kp/cm² for the pressure drop $\Delta p$ and cm³/min for the volume flow Q.

As the above relationships reveal, the shear viscosity with predetermined geometry of the measuring nozzle 47 can be determined through the measurement of the temperature T and of the pressure p or, since the measuring nozzle 47 is open to the atmosphere, Δp can be determined at the entrance 48 of the measuring nozzle 47 when the volume flow Q is predetermined through predetermination of the rotational speed n of the metering pump 44.

These influencing factors for determining the melt index of the melt to be instantaneously moulded via the moulding tool 38 can be indicated on an indicator device 53 and, additionally or instead, a numerical value for the instantaneous shear viscosity can be ascertained directly through programming a computer 54 to the aforesaid relationships, taking into account the known geometry of the measuring nozzle 47.

Figure 3:
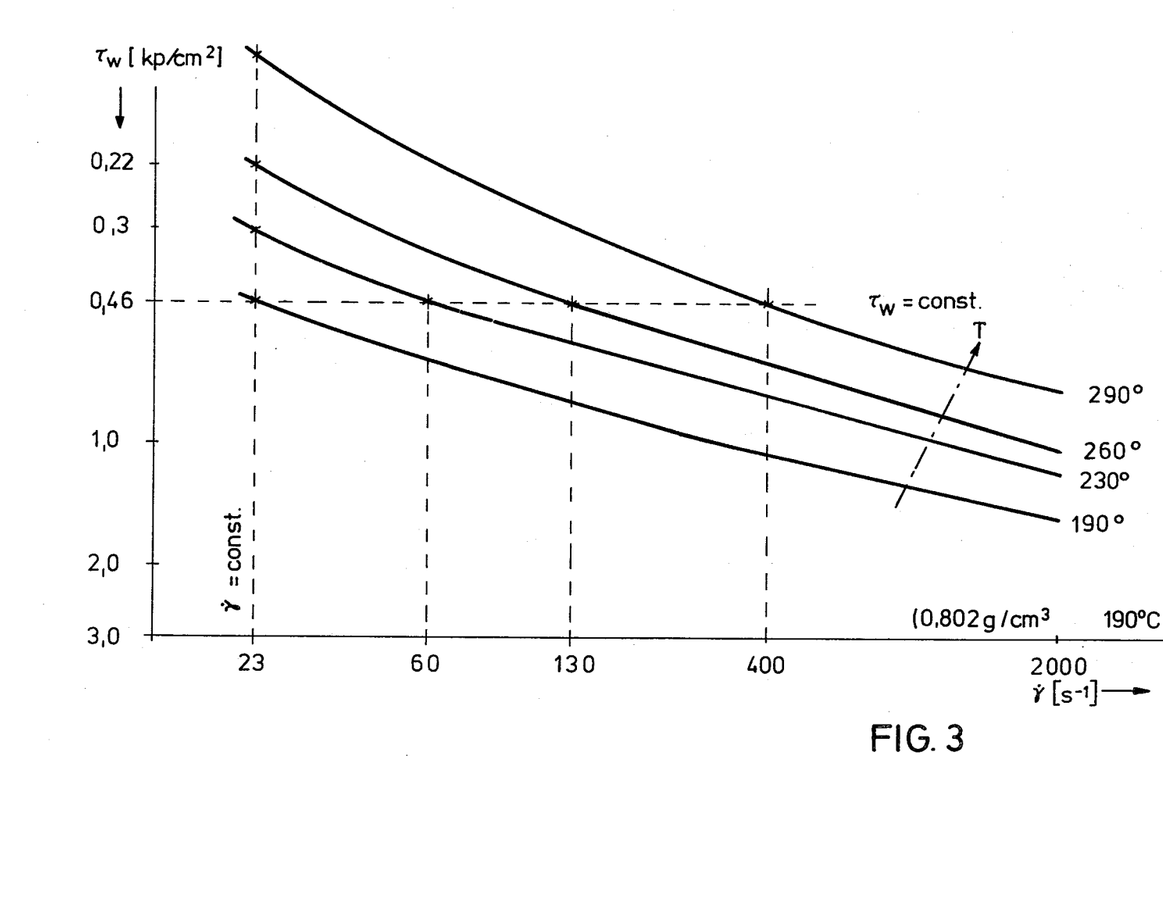
FIG. 3 shows a flow characteristic of polypropylene for a specific measuring nozzle inside the measuring device and with the sample flow temperature as a parameter.

The manufacturers of plastics materials such as polyethylene and polypropylene grade their product range according to the melt indices of these plastics material since, for a specific plastics substance, various application optimisations occur, depending on the melt index which characterises the plastics substance. For a plastics material of a specific melt index, its properties, as far as they are of significance for the moulding of the plastics material, taking into account its thermal treatment, are represented in socalled flow curves. FIG. 3 shows the flow curves for a widely marketed plastics material of Farbwerke Hoechst, namely polypropylene of the normal type PPH with a volume flow of ten grammes per ten minutes at a melting temperature of 190° C., measured according to the standard conditions $MI_5$.

The flow curves as reproduced in FIG. 3 for the said specific plastics material represent the relationship between the wall shear strain $\tau$ wall and the shear speed for various melt temperatures T. From the dependence shown it can be seen that in the case of temperature increase in the melt a stronger degradation of the plastics material takes place which means a higher value in melt index measurement. Above about 290°–300° C., the melt index increase, that is to say the process of thermal degradation always proceeds more rapidly. In the evaluation of the curve course reproduced in FIG. 3 it is to be noted that in both coordinate directions a logarithmitic scale is used.

Flow curves of the nature represented in FIG. 3 can, for each specific plastics material intended for processing, be recorded by means of laboratory measuring methods corresponding to ASTM (American Society for Testing and Materials) Standard D 1238-65T or German Standard Specification (DIN) 53 or according to the ISO Recommendation ISO/R 1133-1970 for MFR determination (melt index measurement), with a predetermined temperature at the measurement nozzle entrance as the parameter.

It is more expedient to record such flow curves for specific, predetermined materials directly with the screw kneader 1 (cf. FIG. 1 or FIG. 2) with the use of the built-on melt index measuring device 43 (see FIG. 2) on which later in the course of production a melt index control according to the present invention is intended to be applied. For this purpose, for a known material fed into the screw kneader 1 with selection of a suitable operating point for the drive of the screw 3 and with intensive heating via the heating ducts 42 to a certain temperature T of the melt in the sample flow channel 45 there is recorded by means of the indicator device 53, a group of curves corresponding to those reproduced in FIG. 3; either subsequently or directly via the connected computer 54, there is effected a conversion according to the above-mentioned relationships, namely $\eta \sim \Delta p/n$.

For obtaining a constant melt index during production, the melt index measuring device 43 transmits an actual value of the index to a two-coordinate controller 55 (see FIG. 2). The two-coordinate controller 55 has two actual value inputs 56, 57 for the pair of actual values corresponding to the coordinates of the controller characteristic 58. The first actual value input 56 is for the operation of the control circuit, connected to the temperature sensor 50 because, as stated below, for the melt index control or viscosity control the controller characteristic 58 always has the instantaneous temperature T as abscissa actual value. The operation of the controller is capable of being switched over in order to operate it alternatively with a temperature-pressure characteristic or with a temperature-delivery amount characteristic as the controller characteristic 58. For switching the modes of operation there is provided a change-over switch group 59 shown symbolically in the single-pole block diagram according to FIG. 2. This change-over switch group 59 is switched on for control according to the temperature-pressure characteristic 58 with constant delivery amount of the metering pump 44, for which purpose the rotational speed indicator 52 of the metering pump 44 on the output side is switched via a rotational speed sensor 60 to the drive motor 51.

The controller characteristic 58 has the function of a desired value giver, i.e. for each pair of actual values at the actual value inputs 56, 57 there is established in the controller 55 whether this pair of actual values lies above or below the controller characteristic 58, and at the controller output 61 there is emitted a corresponding signal concerning the control deviation for the operation of the appropriate correcting element. In order to obtain the controller characteristic 58, the flow chart according to FIG. 3 is taken as a basis. For the switch position, shown in FIG. 2 of the change-over switch group 59, when operating with constant delivery amount of the metering pump 44, corresponding to constant shear speed $\dot{\gamma}$, the shearing strains $\tau$ wall for various melt temperatures T are ascertained and from these the assigned pressure values p are calculated by means of the relationships explained above. For the example shown in FIG. 3 three thus results the characteristic 58 which is reproduced in FIG. 4. As a parameter, for the above-mentioned material on which the present example is based (a polypropylene) a shear speed of $\dot{\gamma}=23s^{-1}$ was chosen. For the various temperatures of the group of curves in FIG. 3 there result from the intersecting point with this parameter, the shear strains $\tau$ wall which can be read off in FIG. 3 and which are entered in FIG. 4 on the left of the ordinate; and from the conversions the pressure values p assigned to the ordinate via the individual temperatures T as abscissa values.

If the two-coordinate controller 55 (see FIG. 2) is an electro-mechanical sampling controller after the style of an x-y sample working in step operation, a templet 62 with an edge corresponding to the controller characteristic 58 is cut out of electrically non-conductive material and placed in the two-coordinate controller 55 on a sampling surface 63 consisting of electrically conductive material. The sampling pin 64 entered symbolically in FIG. 2 is displaceable in two mutually perpendicular directions, i.e. in an x direction and in a y direction, for which purpose servomotors 65, 66 are provided which are operated via the actual inputs 56 or 57. In an expedient and known commercially available two-coordinate controller 55 of this nature, a timer 67 is present which in predeterminable sequence causes a lowering of the sampling pin 64 on to the sampling surface 63. When, by reason of a pair of actual values, the sampling pin 64 stands above the controller characteristic 58, there occurs when the pin 64 contacts the surface 63 the closing of a current circuit which, on the other hand, is not closed when the pin 64 contacts the templet 62 and therefore below the controller characteristic 58. The output signal at the controller output 61 therefore depends on whether the pairs of actual values at the actual value inputs 56, 57 correspond to the coordinate value above or below the controller characteristic 58. Accordingly, closing of the circuit causes operation of the servomotor 30, in such a manner that the passage cross-section through the annular gap throttle 29 is reduced for an instantaneous temperature in the melt the pressure drop p via the measuring nozzle 47 is too great, whereas in the event of too small a pressure drop p the throttle cross-section is enlarged. For this purpose, for example a bi-polar signal can be supplied by the controller output 61, whereas in other practical versions of such two-coordinate controllers 55 the controller output 61 is bi-polar and, depending on whether the servomotor 30 is to be operated for closing or for opening the throttle 29, a signal appears either on the one or on the other wire of the two wire connection to the servomotor 30. When the throttle 29 closes, the resistance for the plastics substance melt which is supplied by the screw kneader 1 via the screen pack 39 to the moulding tool 38 increases, i.e. both the pressure upstream of the moulding tool 38, and thus also in the sample flow channel 45, and the melt temperature T, increase, which corresponds to an increase of the melt index value and thus to an increased degradation of the polypropylene. On the other hand, with further opened throttle 29 the passage resistance through the annular gap 34 falls, i.e. the pressure and thus also the temperature in the melt fall, which corresponds to a reduction of the melt index and thus an increase of the melt viscosity of the polypropylene in the moulding tool 38. Therefore, through appropriate adjustment of the resistance caused by the throttle 29 there is effected an influencing of the temperature and thus of the degree of degradation of the melt which is to be delivered, taking into account the fact that the friction heat in the region of the pressure zone upstream of the tip of the screw kneader 1 increases directly proportionally with the pressure in the melt. A pressure increase, caused by clogging phenomena in the screen pack 39 can be compensated through appropriate enlargement of the effective passage cross-section through the throttle 29, which compensation is ensured automatically and quasi-continuously through the described fluctuations caused by screen exchange when, by means of a screen changing device, a clogged screen pack 39 is exhanged for a fresh screen pack 39 across which a considerably smaller pressure increase takes place. Thus, maintaining a constant melt viscosity through influencing of the control system via the throttle 29 which acts as a correction element is possible, and there is thus provided the prerequisite for automatic operation of the degradation of polypropyelene; the moulding tool 38 yields a product of constant quality despite constantly changing pressure conditions across the screen pack 39, and the kneader screw.

The sampling rate is controlled through a timer 67 so that transit time effects or dead time effects in the course of the propulsion of the melt through the throttle 29 and the screen pack 39 to the moulding tool 38 do not lead to hunting, because a desired value/actual value comparison via the sampling surface 63 always does not again take place in the two-coordinate controller 55 until, after an adjustment of the throttle 29, quasi-stationary conditions have again set in upstream of the moulding tool 38. Depending on the particular conditions this may take between 1 and 10 seconds.

It is, however, expedient not to put the two-coordinate controller 55 into operation after start-up until the plant has been run-in to steady-state conditions to the desired operating point 68 on the controller characteristic 58 (see FIG. 4), as is represented symbolically by the running-in curve 69. A stable operating point 68 does not set in until the operating parameters of the plant have taken steady-state values. During running-in, expediently the starting valve 35 is opened so that the melt which does not yet have any steady-state properties is removed through the outlet 37—instead of through the moulding tool 38—with draw-off through the screen pack 39 of only that amount of melt which is needed for the melt index measuring device 43. For startup, the throttle 29 initially is opened completely. Steady-state conditions have set in when the material throughput, the torque for the drive of the screw kneader 1 whose rotational speed and the temperature distribution over the plant have reached values which are characteristic for the operational state of the plant actually being considered. When, on the indicator device 53 or after conversion via the relationships explained above, it emerges from the computer output of the computer 54 that the operating point 68 is practically reached in that the run-in curve 69 intersects the controller characteristic 58 (see FIG. 4), the starting valve 35 can be closed and the two-coordinate controller 55 can be put into operation. Because of the two-point operation behaviour of the controller 55, the actual values henceforth fluctuate round the controller characteristic 58; the amount of these fluctuations is predeterminable through the sampling intervals (as a rule, between one and ten seconds) via the timer 67.

Expediently, however, there is switched in parallel with the actual value inputs 56, 57 a digital limit selector 70 which in the case of a predeterminable deviation from the controller characteristic 58 operates a signal transmitter 71 and/or puts the two-coordinate controller 55 out of operation if parameters outside the control capacity of the control circuit are generated and the plant must run in afresh. The case may also occur when the apparatus parameters of the production plant, such as throughput, rotational speed and casing temperature of the screw kneader 1, are so unfavourable predetermined that in the case of specific control deviations and in view of predetermined unit shifts by means of the servomotor 30 the operating point 68 is not again reached within a predetermined time.

At the same time, this digital limit selector 70 can be so designed that, after the control circuit has been put into operation, the digital limit selector 70 influences a clamping circuit 72 in such a manner that in the interest of avoiding unnecessary switching of the servomotor 30, an adjustment of the throttle 29 does not occur for slight control deviations but, instead, only in the case of a predetermined amount of control deviation, is a signal given to the servomotor 30 by the controller output 61.

Such a digital limit selector 70 may be constructed in a similar way to a two-coordinate sampler, such as the two-coordinate controller 55 described. On the sampling surface 63 there is then arranged a strip-shaped templet which reproduces the course of the controller characteristic 58 so that the electrical contact which releases the clamping circuit 72 is not made until the sampling pin 64 above or below tis strip contacts the sampling surface 63. In FIG. 2 there is provided at the output of the digital limit selector 70 a changeover switch 73 which, during manual start-up of the plant, is switched to the signal transmitter 71 in order to trigger a signal when the run-in curve 69 (of FIG. 4) intersects the strip-shaped tolerance range 74 on both sides of the controller characteristic 58; the changeover switch 73 is then switched over to the clamping circuit 72 in order to release the signal from the controller output 61 if this tolerance range 74 should again be left during the automatic operation which follows.

Figure 4:
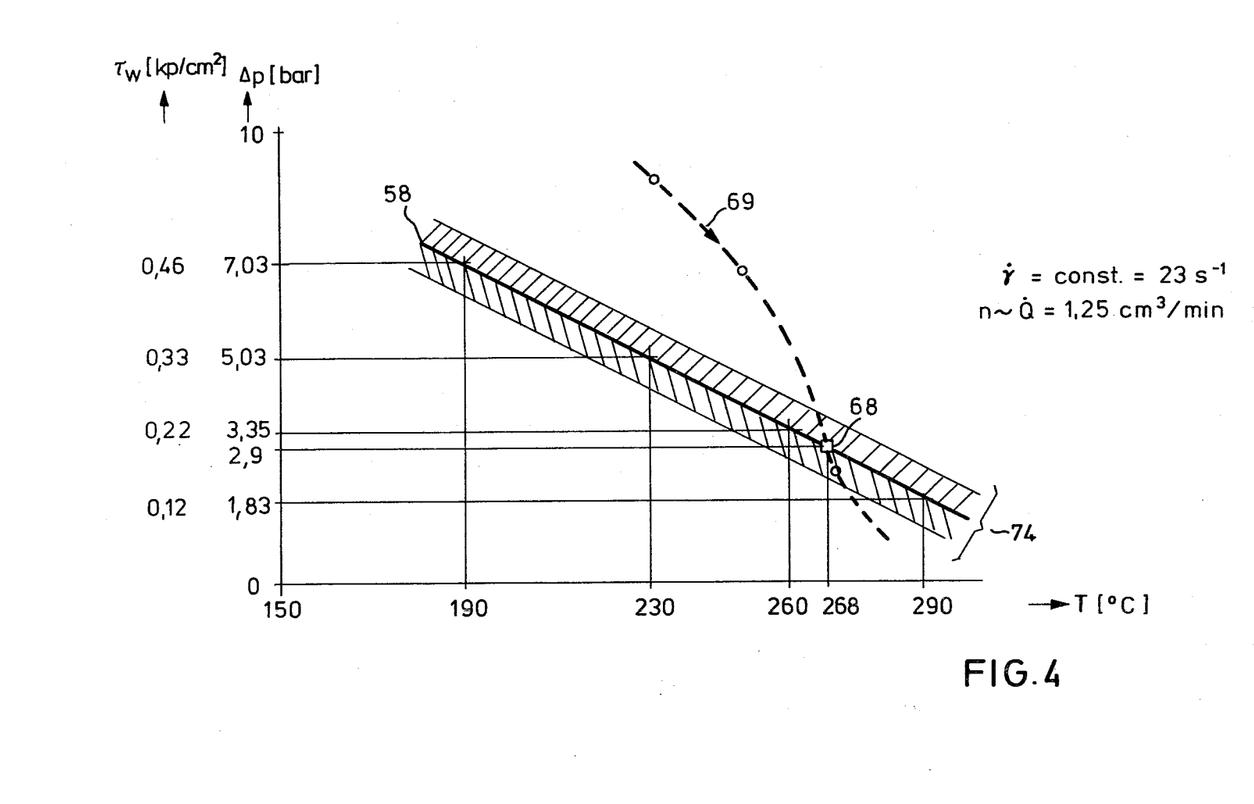
FIG. 4 shows a controller characteristic for operation of a melt index control circuit according to FIG. 2 with, maintained at constant level, sample flow shear speed through the measuring nozzle, ascertained from the flow chart according to FIG. 3.
Figure 5:
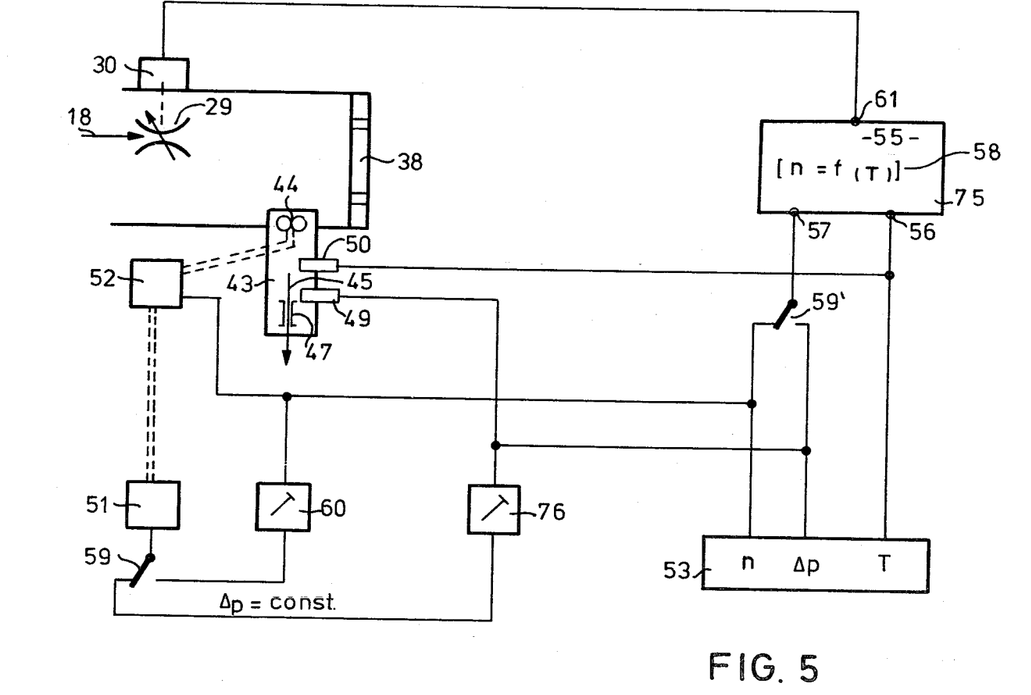
FIG. 5 shows a control circuit according to FIG. 2, but switched over to operation with constant shearing strain of the sample flow through the measuring nozzle.

When, as mentioned at the beginning, the two coordinate controller 55 is in the form of a computer -whether it be a controller computer 75 according to FIG. 5 or a central computer which also serves for recording the flow charts according to FIG. 3 and, after the automatically functioning control circuit has come into operation, serves simultaneously in time-sharing operation as the computer 54 according to FIG. 2 arranged downstream of the indicator device 53. The conversion of a controller characteristic 58 according to FIG. 4 into a polynominal is necessary in order to be able to ascertain for each pair of actual values whether the cross-section of the throttle 29 must be reduced or enlarged. Such a polynominal can be determined empirically from the empirically obtained controller characteristics according to FIG. 4; it is more expedient, during the recording of the data from which a flow chart corresponding to FIG. 3 can be produced, to extrapolate the pairs of values to obtain the polynomial and to set up inside the computer the polynominal by means of subprograms for the definition of characteristics through predetermined pairs of values.

In an experimental embodiment of the present invention according to FIG. 2 with a computer as a two-coordinate controller 55, for the material properties according to FIG. 3/FIG. 4 the following polynomial was taken as a basis:

$$T = 281.214 - 13.220 \Delta p + 0.138 \Delta p^2.$$

Where the two-coordinate controller 55 is a computer, the separate digital limit selector 70 may also be dispensed with, since in the predetermination of the operating programme in time-sharing operation an arithmetical analysis of the pairs of actual values can be carried out simultaneously in the light of predetermined tolerances in regard to the controller characteristic 58 in order, for example in the case of too strong deviations from steady-state operation of the control circuit, to operate the signal transmitter 71 and, on the other hand, in the case of only slight control deviations, to dispense with an operation of the servomotor 30 for changing the effective throttle cross-section. Since a control circuit using a computer as a controller—in the present case the two-coordinate controller 55—anyhow works as discontinuous sampling control circuit whose scanning frequency is predeterminable via the time base for the function of the computer, a separate timer 67 for the periodicity of the sampling is unnecessary. When using a computer as two-coordinate controller 55 it is also readily possible to select the speed of operation of the servomotor 30 in the case of requirement of a change of the throttle cross-section proportional to the instantaneous deviation of the pair of actual values from the controller characteristic 58, for example in such a manner that the correcting signal, provided by the controller output 61, for the servomotor 30 varies in length in the case of a unit amplitude or is varied in amplitude in the case of a unit length. In this manner there is ensured even in the case of relatively strong deviations of the melt properties upstream of the moulding tool 38 a rapid reapproximation to the operating point 68, assigned to the instantaneously given temperature T, on this controller characteristic 58 (cf. FIG. 4).

Further, the use of a computer, for example of the type mentioned at the beginning, also therefore of an electro-mechanical two-coordinate controller 55 according to the principle of x-y sampling, is to be preferred because this computer can be used simultaneously to ascertain and store, or to express, converted data on the melt properties, in particular on temporary deviations from the desired properties, for later monitoring purposes, as certainly is known per se in the case of industrial control circuits using process control computers in other fields of technology.

From relationships stated above it follows that the function of the control circuit according to FIG. 2 would also be ensured when the controller charcteristic 58 satisfies the relationship, n=f (T), for which purpose the shearing strain would have to be kept constant, which would be achievable via an appropriate variation of the sample flow delivery amount through influencing of the rotational speed of the metering pump 44. For the practical function of such a control circuit, the variation of the rotational speed of the metering pump 44, however, would have to sweep a very large range, for which reason a control according to these criteria is, from aspects of practicability and sureness of function of the control circuit, less advisable than the control represented in FIG. 2 in conjunction with FIG. 4.

When, however, no degradation phenomena or cross-linking phenomena of polypropylene as a result of the kneading and heating treatment are aimed at but merely a normal granulation of polypropylene (or of polyethylene), smaller temperature fluctuations occur in the controlled system, that is to say in the region between the discharge point of the screw kneader 1 (cf. FIG. 1) and the moulding tool 38 (cf. FIG. 2, representing for example an underwater granulating plate), and the control circuit need merely be designed to compensate the slow pressure increase caused by the soiling of the screen pack 39 and the instantaneous pressure reduction in the case of exchange of a soiled screen pack 39 for a fresh screen pack 39, through appropriate adjustment of the effective passage cross-section of the throttle 29. Although here too a constant shear speed by reason of constant pump delivery according to FIG. 2/FIG. 4 can again be taken as a basis for the function of the control circuit, in this case operation using the parameter of constant nozzle wall shearing strain corresponding to constant pressure drop via the measuring nozzle 48 without the aforesaid difficulties of too great a variation of the pump rotational speed is also possible; the embodiment represented in FIG. 5/FIG. 6 for accomplishing the method according to the invention is directed to the last mentioned possibility.

For this purpose, the changeover switch group 59 at the input of the drive motor 51 for the metering pump now be switched to the control deviation output of a pressure controller 76 whose actual value input is arranged downstream of the pressure sensor 49 which in FIG. 5 is reduced to that which is essential to the function and is reproduced in connection with a likewise simplified symbolic representation of the other plant parts from FIG. 2.

To the first actual value input 56 of the two-coordinate controller 55 there is again switched the temperature sensor 50 while the second actual value input 57 is now connected via the changeover switch group 59′ to the output of the rotational speed indicator 52; i.e., the second actual value is the instantaneous rotational speed with which the metering pump 44 is driven in order to maintain according to the invention a constant pressure drop $\Delta p$ via the measuring nozzle 47, independently of pressure fluctuations and temperature fluctuations in the melt within the controlled system upstream of the moulding tool 38.

Figure 6:
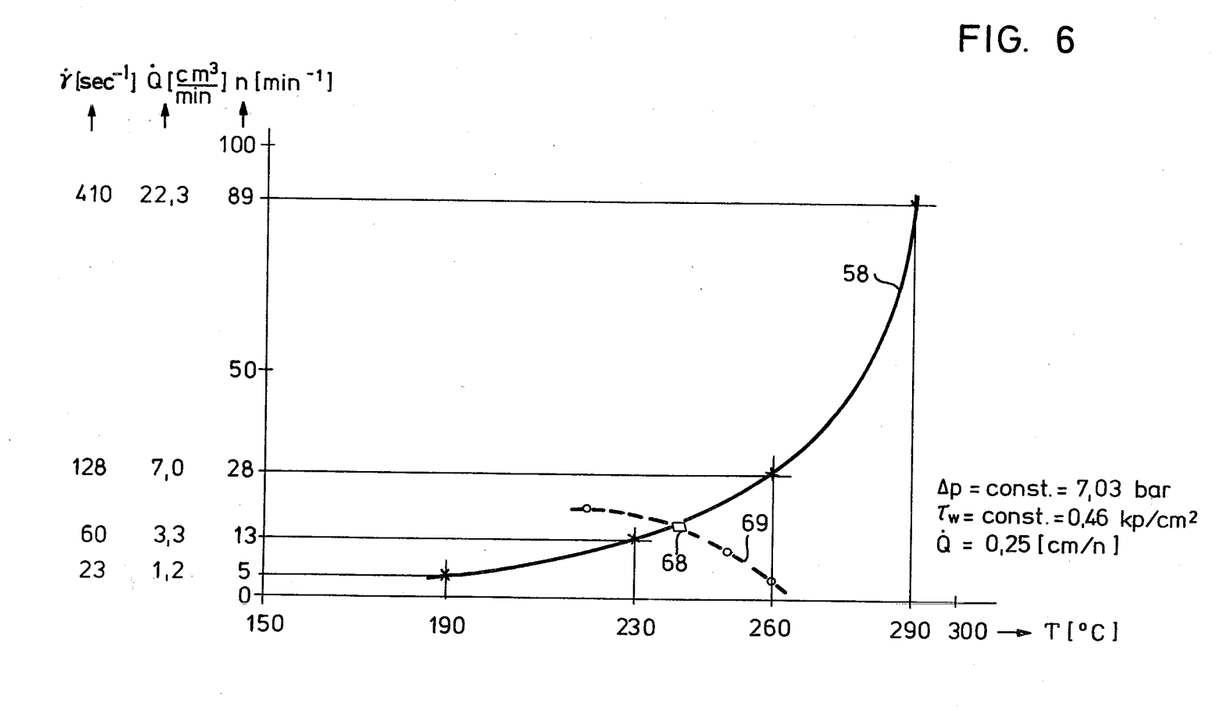
FIG. 6 shows a controller characteristic according to FIG. 4 for the control circuit according to FIG. 5.

The two-coordinate controller 55 now works according to the controller characteristic 58 reproduced in FIG. 6 which, in a similar manner to the procedure for obtaining a controller characteristic 58 according to FIG. 4, can again be obtained from the empirically ascertained flow curves according to the flow chart FIG. 3, for which purpose the corresponding points of intersection in FIG. 6 entered on the left beside the ordinate. Also stated there are the assigned values, resulting from the geometry of the measuring nozzle 47, for the volume flow $Q$ with the respective metering pump rotational speed n, which values result from the dependence stated above for the shear speed $\dot{\gamma}$.

As already explained for the example of a controller characteristic 58 according to FIG. 4, the controller characteristic 58 for the two-coordinate controller 55 can also be represented as polynomial in the build-up of the control circuit according to FIG. 5 in order to again have the two-coordinate controller 55 in the form of computer 75.

For pairs of actual values which lie above the controller characteristic 58 (FIG. 6) the servomotor 30 is operated to close the throttle 29, but in the case of pairs of actual values below the controller characteristic the throttle 29 is opened.

For stability reasons, in this embodiment too, it is again advisable after start-up to control the plant by hand, say along the run-in curve 69 in FIG. 6 until an operating point 68 on the controller characteristic 58 is reached at least approximately before switching over to automatic control. For the scanning frequency of the discontinuously working two-coordinate controller 55 to prevent hunting there again hold good the discussions brought above in connection with FIG. 2/FIG. 4. It would also be possible, which is not shown in the drawing, to operate the melt viscosity control circuit with a controller characteristic according to the relationship for amount flow dependent pressure $$\Delta p = 2 \left[ \frac{\dot{Q}(m+3)}{\Phi \cdot \pi} \right]^{1/m} \cdot \frac{L}{R^{1+3/m}}$$

for which purpose, of course, a start would have to be made from the assumption of constant temperature T corresponding to the individual flow curves of the flow chart according to FIG. 3. If this assumption is not allowable it is, however, possible to superimpose the dependence on the melt temperature T, which dependence is shown in the flow chart according to FIG. 3, on the control circuit as an additional actuating variable after the manner of a disturbance according to the relationships $m = f(T)$ and $\Phi = f(T)$.

The above modified controller characteristic (cf. E. Bernhardt, loc. cit. page 257, Equation 152) holds good for intrinsically viscous substances such as polymer melts which obey the flow law $\dot{\gamma} = \Phi \cdot \tau^m$ in which m = the flow index and $\Phi = 1/\eta$ the fluidity are substance values and $\tau$ is again the shearing strain of the melt on the wall of the measuring nozzle.

In all cases, through the solution according to the invention, namely through interference in a melt viscosity controlled system via a throttle as a correcting element and with the use of a known-per-se melt index measuring device for obtaining pairs of actual values for a two-coordinate controller, it is possible to compensate fluctuations in the quality of the fed in product upstream of a moulding tool in such a manner that for the product which leaves the moulding tool there is achieved a uniform quality such as is desired in particular in the case of extrusion production processes but also in the case of raw material granulation.

What is claimed is:

1. A control arrangement for a plastics extruder having a casing, which includes a screw extruder, a screen downstream of the screw extruder, a throttle having a cross section located between the screw extruder and the screen wherein said throttle is constructed as an axial annular gap throttle comprising a hollow cylinder and a pin piston axially displaceable therein by a servomotor means, a moulding tool downstream of the screen, and a melt index measuring device disposed in close thermal contact on a casing of the extruder, between said screen and said moulding tool; said melt index measuring device comprising a metering pump whose rotational speed is controllable and which is provided with a rotational speed indicator, a sample flow channel, a measuring nozzle disposed in the sample flow channel, and pressure and temperature sensors connected to the sample flow channel directly upstream of the inlet of the measuring nozzle, the sample flow channel being located downstream of the screen and upstream of the moulding tool, wherein the control arrangement comprises said servometer means for varying said cross section of said throttle to regulate the viscosity of a plastics material melted in said screw extruder, said servomotor means being connected to the output of a programmable two-coordinate controller whose characteristic provides a desired value output and can be determined as a temperature-pressure characteristic when the metering pump is operated with constant delivery, or as a temperature-delivery characteristic when the metering pump is operated with a constant pressure drop via said measuring nozzle, and a temperature sensor connected to one of two actual value inputs of said two-coordinate controller, and wherein at least one of said pressure sensor and said rotational speed indicator is connected to actual value input.

2. An arrangement according to claim 1, including a control circuit with discontinuously working two-coordinate controller.

3. An arrangement according to claim 1, wherein said two-coordinate controller includes therein as a desired value/actual value comparator a x-y sampler, which is operated by the two actual values and switches in the fashion of an on-off controller, and including scanning a templet cut in accordance with the setpoint function.

4. An arrangement according to claim 1, wherein in said two-coordinate controller there is provided a desired value/actual value comparator a digital comparison computer in which the desired value function can be stored as a polynomial, and which digital comparison computer triggers a controller output signal according to the deviation of the pairs of actual values from the desired value function.

5. An arrangement according to claim 4, wherein the controller output signal and/or the sampling interval for acceptance of pairs of actual values into said two-coordinate controller is variable in dependence on the desired value deviation.

6. An arrangement according to claim 4, wherein the controller output signal is determined by the desired value/actual value deviation of the pressure or of the delivery amount at temperature actual value.

7. An arrangement according to claim 4, wherein in the desired value/actual value comparison for the provision of a controller output signal for the operation of said servomotor a switching hysteresis means is provided.

8. An arrangement according to claim 1, wherein when a predeterminable derivation is exceeded a clamping circuit between the controller output and the servomotor and, where appropriate, a signal transmitter can be operated by a digital limit selector.

9. An arrangement according to claim 4, wherein as the setpoint characteristic the relationship $$\Delta p = 2 \left[ \frac{\dot{Q}(m+3)}{\Phi \cdot \pi} \right]^{1/m} \cdot \frac{L}{R^{1+3/m}}$$

is predetermined, wherein
$\Delta p$ is the pressure drop via the measuring nozzle,
R is the radius of the measuring nozzle
L is the length of the measuring nozzle
$\dot{Q}$ is the delivery amount of the metering pump proportional to the rotational speed n of the metering pump,
$\Phi$ is the fluidity of the plastics material and
m is the flow index of the plastics material, with a dependence m, $\Phi = f(T)$.

* * * * *